US012600676B2

(12) United States Patent
Singh et al.

(10) Patent No.: US 12,600,676 B2
(45) Date of Patent: Apr. 14, 2026

(54) POLYMER-DERIVED CERAMIC FIBERS AND METHODS OF PREPARING THE SAME

(71) Applicant: Kansas State University Research Foundation, Manhattan, KS (US)

(72) Inventors: Gurpreet Singh, Manhattan, KS (US); Zhongkan Ren, Manhattan, KS (US)

(73) Assignee: Kansas State University Research Foundation, Manhattan, KS (US)

(*) Notice: Subject to any disclaimer, the term of this patent is extended or adjusted under 35 U.S.C. 154(b) by 283 days.

(21) Appl. No.: 17/642,326

(22) PCT Filed: Sep. 10, 2020

(86) PCT No.: PCT/US2020/050054
§ 371 (c)(1),
(2) Date: Mar. 11, 2022

(87) PCT Pub. No.: WO2021/050632
PCT Pub. Date: Mar. 18, 2021

(65) Prior Publication Data

US 2022/0340494 A1 Oct. 27, 2022

Related U.S. Application Data

(60) Provisional application No. 63/011,402, filed on Apr. 17, 2020, provisional application No. 62/899,942, filed on Sep. 13, 2019.

(51) Int. Cl.

| | |
|---|---|
| ***C04B 35/56*** | (2006.01) |
| ***C04B 35/622*** | (2006.01) |

(Continued)

(52) U.S. Cl.
CPC .... *C04B 35/5603* (2013.01); *C04B 35/62281* (2013.01); *C04B 35/64* (2013.01);
(Continued)

(58) Field of Classification Search
CPC ................ D01F 1/02; C04B 2235/483; C04B 35/62281
See application file for complete search history.

(56) References Cited

U.S. PATENT DOCUMENTS 4,134,759 A * 1/1979 Yajima ............. C04B 35/62849 419/24
4,931,316 A 6/1990 Johnson
(Continued)

FOREIGN PATENT DOCUMENTS

CN 104291812 A * 1/2015

OTHER PUBLICATIONS

CN-104291812-A (Liu) Jan. 21, 2015 (English language machine translation). [online] [retrieved May 30, 2024]. Retrieved from: Espacenet. (Year: 2015).*
(Continued)

*Primary Examiner* — Erin Snelting
(74) *Attorney, Agent, or Firm* — Hovey Williams, LLP

(57) ABSTRACT

Ceramic matrix composite (CMC) materials are a desired solution for lightweight and high temperature applications. CMC materials can be reinforced with polymer-derived ceramic (PDC) fibers, which advantageously possess intrinsic thermal stability and high mechanical strength. Carbon-rich SiOC and SiOCN fibers were synthesized via hand-drawing and electrospinning polymer pyrolysis of a hybrid precursor materials with the aid of a spinning reagent. The prepared fibers are crosslinked and pyrolyzed for polymer-to-ceramic conversion.

13 Claims, 8 Drawing Sheets

(51) Int. Cl.
*C04B 35/64* (2006.01)
*D01F 1/02* (2006.01)
*D01F 6/94* (2006.01)
*D01F 11/08* (2006.01)

(52) U.S. Cl.
CPC .................. *D01F 1/02* (2013.01); *D01F 6/94* (2013.01); *D01F 11/08* (2013.01); *C04B 2235/483* (2013.01); *C04B 2235/5244* (2013.01); *C04B 2235/5248* (2013.01)

(56) References Cited

U.S. PATENT DOCUMENTS

| | | | | |
|---|---|---|---|---|
| 5,017,528 | A * | 5/1991 | Tiegs | C04B 35/62844 428/378 |
| 5,256,487 | A | 10/1993 | Myers | |
| 5,358,674 | A | 10/1994 | Rabe | |
| 5,783,139 | A * | 7/1998 | Curran | C04B 35/56 419/10 |
| 5,851,942 | A | 12/1998 | Sacks et al. | |
| 5,958,324 | A | 9/1999 | Buialski et al. | |
| 7,749,425 | B2 | 7/2010 | Malenfant et al. | |
| 9,587,331 | B2 | 3/2017 | Mills et al. | |
| 10,961,354 | B1 * | 3/2021 | Eckel | B28B 1/001 |

OTHER PUBLICATIONS

International Search Report and Written Opinion in corresponding PCT/US2020/50054, dated Jun. 3, 2021.

* cited by examiner

POLYMER-DERIVED CERAMIC FIBERS AND METHODS OF PREPARING THE SAME

CROSS-REFERENCE TO RELATED APPLICATIONS

The present application is the U.S. National Stage of International Patent Application No. PCT/US2020/050054, filed Sep. 10, 2020, which claims the benefit of U.S. Provisional Patent Application No. 62/899,942, filed Sep. 13, 2019, and U.S. Provisional Patent Application No. 63/011,402, filed Apr. 17, 2020, each of which is incorporated by reference in its entirety herein.

STATEMENT REGARDING FEDERALLY SPONSORED RESEARCH

This invention was made with government support under grant no. 1743701 awarded by the National Science Foundation. The government has certain rights in the invention.

BACKGROUND OF THE INVENTION

Field of the Invention

The present invention is generally directed toward polymer-derived ceramic fibers, such as SiOC and/or SiOCN fibers, and methods of producing the fibers from silazane or siloxane and organic polymer precursor materials.

Description of the Prior Art

Over the past few decades, there has been a rising desire for new structural aerospace materials with lightweight, high modulus and high thermal stability that has motivated the advance of materials science. Non-oxide ceramic matrix composites (CMCs) are known to fulfill all the demands because of the low density, remarkable mechanical strength and chemical resistance as well as elevated fracture toughness by fiber-reinforcement. The microporous and microcracked matrix allows several times higher strain-to-failure than monolithic ceramics that makes it one of the optimum structural materials at high temperature, while reinforcement contribution is mainly toward properties such as electrical conductivity, hardness, thermal expansion and shock resistance.

Polymer-derived ceramic fibers (PDCFs) are considered an admirable reinforcement for CMCs due to improved properties and ease of fabrication by the recent innovations in polymer fiber fabrication techniques. Over the last three decades, Si-based advanced ceramics with a variety of desirable properties, such as remarkable electrochemical behavior, chemical resistance, thermal stability and mechanical strength, have been designed with the help of straightforward polymer-to-ceramic conversion. Silicon-based ceramics have the extraordinary potential of high-temperature applications for promising mechanical properties at elevated temperatures and oxidizing environments. The mechanical properties of PDCFs have been reported as high as 2.5 GPa in tensile strength with 300 GPa in modulus while remaining stable up to 2200° C.

With the rising demand for better processability, higher ceramic yield and enhanced properties of final ceramic product, a number of new silicon-based preceramic polymers were synthesized in the 1980s with modified properties that are sufficient for spinning. The large-scale production of ceramic fibers started early as the 1990s. Either melt- or dry-spinning processes were applied to mainly polysilanes or polyborosilazanes to produce non-oxide SiC or SiBCN fibers. In terms of melt-spinning, modified polymer with the required viscosity is continuously fed through a heated (about 150° C.) nozzle with hundreds of holes. Fibers are effectively drawn in this way and cured by additional thermal or chemical treatments. Up until recently, there were many types of ceramic fibers developed over 20 years ago and still commercially available from various manufacturers, such as Hi-Nicalon (from COI), Sylramic (from UBE), etc.

Currently, both oxide and non-oxide (from a polymer pyrolysis route) ceramic fibers are widely applied for high temperature applications. Oxide fibers usually deliver higher oxidation resistance compared to non-oxide fibers, while better creep resistance and strength retention allow non-oxide fibers to be even more suitable for ultrahigh temperature applications, such as aerospace components. However, polycarbosilane, a main precursor of SiC fibers, is still costly and limited in availability. Hence, ceramic fibers with extremely lower cost and slightly compromised properties are of great interest. On the contrary, other Si-based ceramics by PDC routes, such as a SiCN ternary system was previously reported with an oxidation resistance as high as 1300° C. via a cost-effective synthesis method. The formation of an $SiO_2$ and $Si_2N_2O$ double layered structure generates increased diffusion barrier, thus leading to an enhanced oxidation resistance.

SUMMARY OF THE INVENTION

According to one embodiment of the present invention there is provided a method of producing ceramic fiber materials. A reaction mixture is formed comprising a liquid preceramic composition and a spinning reagent. Preceramic polymer fibers are spun from the reaction mixture. The preceramic polymer fibers are then crosslinked to form crosslinked preceramic polymer fibers. The preceramic polymer fibers are pyrolyzed to form the ceramic fiber materials.

According to another embodiment of the present invention there is provided a method of producing silicon oxycarbide fibers. A reaction mixture is formed comprising a liquid preceramic composition and a spinning reagent. The liquid preceramic composition comprises a siloxane and/or a silazane. The spinning reagent comprises polyacrylic acid, polyvinylpyrrolidone, and/or polyacrylonitrile. Preceramic polymer fibers are spun from the reaction mixture using a wet spinning, a melt spinning, a gel spinning, or an electrospinning process. The preceramic polymer fibers are crosslinked to form crosslinked preceramic polymer fibers. The crosslinked preceramic polymer fibers are then pyrolyzed to form the silicon oxycarbide fibers.

According to yet another embodiment of the present invention there is provided a ceramic fiber material comprising from about 1% to about 90% by weight silicon, from about 1% to about 90% by weight oxygen, and from about 1% to about 90% by weight carbon. At least a portion of the carbon is present as free carbon, and the ceramic fiber material comprises a plurality of ceramic fibers having a average diameter of from about 0.1 to about 50 μm.

DETAILED DESCRIPTION OF THE PREFERRED EMBODIMENT

Figure 1:
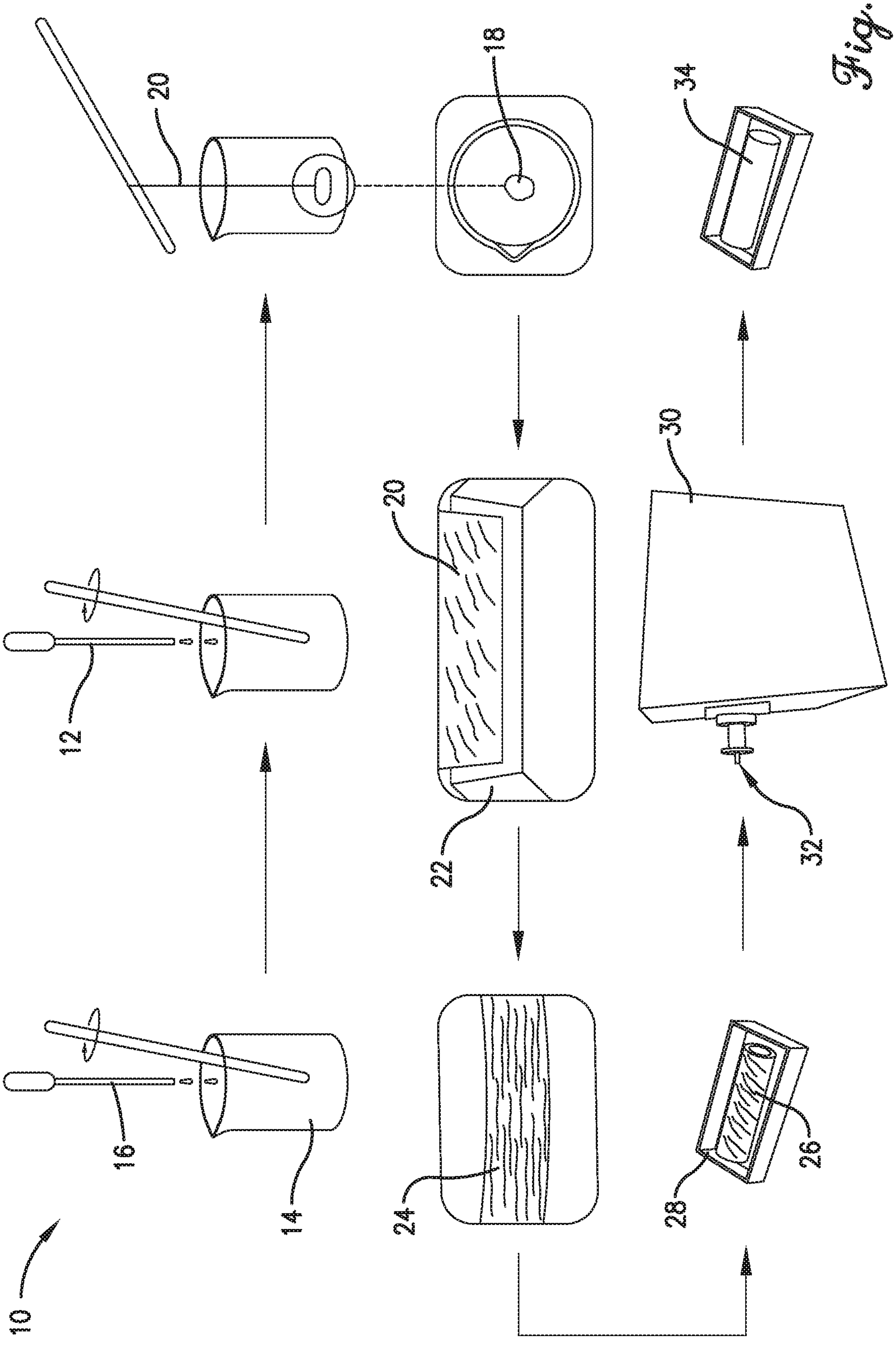
FIG. 1 is a schematic illustration of a fiber drawing process.

Embodiments of the present invention are directed toward the use of silicon-based polymers (inorganic) and hybrid polymers (organic/inorganic) for making silicon carbonitride fibers. Ceramic matrix composite (CMC) materials have been considered a desired solution for lightweight and high temperature applications. Simultaneously, among all different CMC reinforcements, Polymer-Derived Ceramic (PDC) fibers have gained attention for their intrinsic thermal stability and mechanical strength with simple and cost-effective synthesis techniques. One or more embodiments of the present invention synthesize carbon-rich SiOCN fibers via a spinning process followed by crosslinking and/or polymer pyrolysis of a hybrid precursor material. In preferred embodiments, the precursor material comprises 1,3,5,7-tetramethyl-1,3,5,7-tetravinyl-cyclotetrasilazane (TTCSZ) and a spinning reagent, such as polyacrylic acid (PAA) or polyvinylpyrrolidone (PVP).

Certain silazanes, including TTCSZ, are considered major precursors for SiCN fibers. However, these silazanes are unspinnable if used pure, due to their unfavorable physical properties (low viscosity) and chemical structure (cyclic rather than linear structure). It was discovered that the introduction of a spinning reagent, such as PAA, to the silizanes, e.g., TTCSZ, to create a hybrid precursor remarkably improved spinnability of the silazane. This technique appears widely applicable to other unspinnable PDC preceramic polymers.

In one or more embodiments, silicon oxycarbide or SiOC fibers are prepared via electrospinning and pyrolysis of various polysiloxane (preceramic polymer) and spinning reagent (e.g., polyvinylpyrrolidone (PVP)) hybrid precursors, and the SiOC fiber materials formed therefrom. Electrospinning is a flexible and scalable technique to draw micro to sub-micron fibers from molten polymers or polymer solutions with simple setup and easy operation. Fibers are formed by the strong electrostatic charges (caused by the electric field between the spinning needle and the collector). The fiber mats can further be heat-treated to ceramic fibers via PDC route. The spinning solution generally comprises one or more preceramic precursors and a solvent that evaporates during spinning. Extra organic polymer may be added as a spinning agent that optimizes the viscosity. The fiber diameter and morphology can be controllable primarily through spinning parameters. However, fiber morphology is also tunable through crosslinking and pyrolysis conditions employed.

Certain embodiments of the present invention are directed to electrospun SiOC fibers synthesized from hybrid precursors comprising preceramic material (e.g., siloxanes) and a spinning reagent (e.g., polyvinylpyrrolidone (PVP)). In preferred embodiments, the preceramic material comprises 1,3,5,7-tetravinyl-1,3,5,7-tetramethylcyclotetrasiloxane (referred as 4-TTCS), Pt-1,3,5,7-tetravinyl-1,3,5,7-tetramethylcyclotetrasiloxane complex (e.g., 2% Pt in 4-TTCS, referred as Pt-TTCS), 1,3,5-trivinyl-1,3,5-trimethylcyclotrisiloxane (referred as 3-TTCS), and/or 1,3-divinyltetramethyldisiloxane (referred as DTDS) and a spinning reagent. Generally, the siloxane precursors identified herein are initially unspinnable. Thus, a spinning reagent can be used to achieve the desired viscosity and enable electrospinning. The spinning reagent generally comprises one or more linear polymers having relatively high molecular weight. In certain embodiments, the spinning reagent has a molecular weight at least 100,000, or 500,000, or 1,000,000 g $mol^{-1}$ greater than that of the precursor material. In certain embodiments, the spinning reagent comprises polyvinylpyrrolidone (PVP), polyacrylic acid (PAA), and/or polyacrylonitrile (PAN). In certain preferred embodiments, the spinning reagent is polyvinylpyrrolidone (PVP). According to certain embodiments, the as-spun fiber mats can be crosslinked and pyrolyzed to form a ceramic fiber material.

The morphology of the fibers can be revealed by viscosity analysis, scanning electron microscopy (SEM) and transmission electron microscopy (TEM). Crosslinking reactions of preceramic material, spinning reagent, and polymer-to-ceramic conversion can be studied via Raman spectroscopy, Fourier-transform infrared spectroscopy (FTIR), X-ray photoelectron spectroscopy (XPS) and nuclear magnetic resonance (NMR).

According to certain embodiments of the present invention, polymer-derived ceramic fibers are provided that comprise significant levels of free carbon (e.g., graphitic carbon or carbon that is not bound up with silicon). Preferably, the fibers are derived from silicon-based polymers, and most preferably polymers based upon siloxane and silazane compounds. Preferably, the ceramic fibers are formed from a reaction mixture that includes an organic polymer spinning reagent, such as an organic polyacid, preferably polyacrylic acid, or polyvinyl pyrrolidone. Fibers are spun or drawn from this mixture. In certain embodiments, the fibers are preferably spun from this mixture via various techniques such as a wet spinning, a melt spinning, a gel spinning, or an electrospinning process as described herein. The resulting fibers are then cross-linked via a heat treatment step to form a silicon-based polymer intermediate which is the precursor to the final ceramic fiber material. The ceramic fibers are formed via pyrolyzation of the polymer intermediate fibers. The higher the pyrolyzation temperature, the more free and graphitic carbon that is formed in the fiber material. In certain embodiments, the fibers formed have a diameter range of from about 0.1 to about 50 μm, from about 0.5 to about 25 μm, or from about 1 to about 10 μm. In certain embodiments, each pyrolyzed fiber is substantially uniform in diameter and porous at the surface. The composition and properties of the final ceramic fiber material is highly dependent on the precursor materials used.

Also, in certain embodiments, the ceramic fibers comprise from about 30% to about 80% by weight, from about 40% to about 70% by weight, or from about 50% to about 60% by weight carbon.

In certain embodiments, the ceramic fibers comprise from about 10% to about 65% by weight, from about 20% to about 55% by weight, or from about 30% to about 45% by weight silicon.

In certain embodiments, the ceramic fibers comprise from about 3% to about 15% by weight, from about 5% to about 12% by weight, or from about 7% to about 10% by weight oxygen.

In certain embodiments, the ceramic fibers comprise from about 0.05% to about 2% by weight, from about 0.1% to about 1% by weight, or from about 0.5% to about 0.8% by weight nitrogen.

In certain embodiments, the ceramic fibers generally comprise from about 1% to about 90% by weight, from about 5% to about 75% by weight, or from about 10% to about 50% by weight carbon. However, in certain embodiments, or particularly when the preceramic polymer comprises 4-TTCS or DTDS, the ceramic fibers comprise from about 20% to about 80% by weight, from about 25% to about 50% by weight, or from about 30% to about 45% by weight carbon. However, in certain embodiments, or particularly when the preceramic polymer comprises Pt-TTCS or 3-TTCS, the ceramic fibers comprise from about 2% to about 50% by weight, from about 5% to about 25% by weight, or from about 10% to about 15% by weight carbon.

In certain embodiments, the ceramic fibers generally comprise from about 1% to about 90% by weight, from about 10% to about 75% by weight, or from about 20% to about 50% by weight silicon. However, in certain embodiments, or particularly when the preceramic polymer comprises 4-TTCS or DTDS, the ceramic fibers comprise from about 2% to about 40% by weight, from about 10% to about 35% by weight, or from about 20% to about 30% by weight silicon. However, in certain embodiments, or particularly when the preceramic polymer comprises Pt-TTCS or 3-TTCS, the ceramic fibers comprise from about 20% to about 80% by weight, from about 30% to about 50% by weight, or from about 35% to about 45% by weight silicon.

In certain embodiments, the ceramic fibers generally comprise from about 1% to about 90% by weight, from about 25% to about 75% by weight, or from about 30% to about 50% by weight oxygen. However, in certain embodiments, or particularly when the preceramic polymer comprises 4-TTCS or DTDS, the ceramic fibers comprise from about 5% to about 50% by weight, from about 25% to about 45% by weight, or from about 30% to about 40% by weight oxygen. However, in certain embodiments, or particularly when the preceramic polymer comprises Pt-TTCS or 3-TTCS, the ceramic fibers comprise from about 10% to about 75% by weight, from about 30% to about 60% by weight, or from about 40% to about 50% by weight oxygen.

In certain embodiments, the fibers formed generally have a diameter range of from about 0.1 to about 50 μm, from about 0.2 to about 25 μm, or from about 0.5 to about 10 μm. However, in certain embodiments, and particularly when the preceramic polymer comprises 4-TTCS or Pt-TTCS, the fibers formed have a diameter range of from about 3 to about 5 μm). However, in certain embodiments, and particularly when the preceramic polymer comprises 3-TTCS, the fibers formed have a diameter range of from about 1 to about 3 μm). However, in certain embodiments, and particularly when the preceramic polymer comprises DTDS, the fibers formed have a diameter range of from about 0.5 μm. In certain embodiments, each pyrolyzed fiber is substantially uniform in diameter and porous at the surface.

In certain embodiments, the ceramic fibers comprise from about 0.05% to about 2% by weight, from about 0.1% to about 1% by weight, or from about 0.5% to about 0.8% by weight nitrogen.

In certain embodiments, the ceramic fibers made according to the present invention exhibit thermal stability at temperatures of at least 1000° C., especially when pyrolyzation occurs at a temperature of 800° C. or higher.

According to other embodiments of the present invention, methods of forming polymer-derived ceramic fibers are provided. FIG. 1 schematically depicts an exemplary process 10 for forming the fibers. First, hybrid inorganic/organic fibers are prepared. The hybrid fibers preferably are prepared via a sol-gel process, but a melt spin process may be employed as an alternative to fiber formation in an aqueous environment. In the sol-gel process from about 2% to about 25% by weight, from about 5% to about 20% by weight, or from about 8% to about 12% by weight of a crosslinking agent, such as dicumyl peroxide, is dissolved in the silicon-based compound (e.g., a silazane or siloxane) 12. An organic polymer solution 14 (e.g, a PAA solution) is prepared by mixing the organic polymer with water 16 in a weight ratio of from about 0.5:1 to about 10:1, from about 1:1 to about 7:1, or from about 2:1 to about 5:1 (water to organic polymer). This solution is stirred until a gel is formed. The silicon-polymer/crosslinking agent solution is added to the gel to give a silicon polymer solution 18 to organic polymer weight ratio of from about 1:5 to about 5:1, from about 2.5:1 to about 1:2.5, or about 1:1. In certain embodiments the overall weight ratio of silicon compound to crosslinking agent to organic polymer is 45:5:50.

The fibers 20 are then spun or drawn from the sol-gel are dried. As illustrated in FIG. 1, the fibers 20 are optionally laid across an aluminum boat 22 and crosslinked in a low temperature oven (from about 100° C. to about 200° C., preferably 160° C.) in air for a period of time of about 1 hour to about 48 hours, preferably from about 12 hours to 36 hours, and most preferably about 24 hours to form crosslinked fibers 24. After crosslinking, the fibers are pyrolyzed, preferably under an inert atmosphere such as argon, to form the ceramic fibers. In one embodiment, the fibers 24 are rolled on a ceramic rod 26, which is then placed in an alumina boat 28. Pyrolyzation preferably occurs within a furnace 30 supplied with inert gas 32 at a temperature of at least 600° C., and preferably between about 600° C. to about 900° C. to produce the ceramic fibers 34.

According to still further embodiments of the present invention, methods of forming polymer-derived ceramic fibers via an electrospinning process 48 are provided. First, hybrid precursor materials are prepared. The hybrid materials preferably are prepared by dissolving from about 0.1% to about 10% by weight, from about 0.5% to about 5% by weight, or from about 1% to about 2% by weight of a crosslinking agent, such as dicumyl peroxide, in the silicon-based preceramic material (e.g., siloxane) 50. However, in certain embodiments, a crosslinking agent is not used, for example when the siloxane is Pt-TTCS (Pt is the crosslinker). A spinning reagent solution 52 (e.g., a PVP solution) is prepared by mixing the reagent 54 with solvent 56 (e.g., isopropanol or water) in a weight ratio of from about 0.5:1 to about 10:1, from about 1:1 to about 7:1, or from about 2:1 to about 5:1 (reagent to solvent). This solution 52 is stirred until the reagent is dissolved. The silicon-polymer/crosslinking agent solution 50 is then added to the PVP/solvent solution and stirred to form a gel 58. In certain embodiments, the weight ratio of silicon polymer to PVP in the gel is from about 1:5 to about 5:1, from about 2.5:1 to about 1:2.5, or about 1:1.

Next, the hybrid precursor (e.g., siloxane/PVP hybrid gel) can be loaded to a syringe 60 with a flat metallic needle 62 and fed at the speed of about 1 $ml \cdot hr^{-1}$ to about 10 $ml \cdot hr^{-1}$, about 2 $ml \cdot hr^{-1}$ to about 9 $ml \cdot hr^{-1}$, or about 3 $ml \cdot hr^{-1}$ to about 8 $ml \cdot hr^{-1}$. The needle 62 can be subjected to a voltage or about 5 kV to about 30 kV, or about 10 to about 20 kV. The distance between the needle tip and the collector 64 can be about 10 cm to about 30 cm, or about 15 cm to about 25 cm. The electrospinning process can then be carried out, as described herein, and the electrospun fibers 66 collected, for example as a fiber mat 68.

The electrospun fibers are then dried and crosslinked in a low temperature oven (from about 100° C. to about 200° C., preferably 160° C.) in air for a period of time of about 1 hour to about 48 hours, preferably from about 12 hours to 36 hours, and most preferably about 24 hours. The crosslinked fibers may be in the form of a preceramic polymer (e.g., polysiloxane) material 70. After crosslinking, the fibers are pyrolyzed, preferably under an inert atmosphere such as argon, to form the ceramic fibers 72. The pyrolysis can be performed at a heating rate of about 1° $C. \cdot min^{-1}$ to about 5° $C. \cdot min^{-1}$ and about 5 min to about 60 min annealing at the target temperature. Pyrolyzation preferably occurs at a target temperature of at least 400° C., 600° C., 800° C., or 1000° C., and preferably between about 400° C. to about 1200° C.

EXAMPLES

Example 1

Experimental (a) Materials

All the syntheses were conducted with as-received materials without further treatment or purification. The TTCSZ is available from Gelest (USA). The polyacrylic acid (PAA) is purchased from Sigma-Aldrich (USA). Dicumyl peroxide (DCP) as crosslinking initiator is obtained from Sigma-Aldrich (USA). The fiber drawing, handling and crosslinking processes are performed in open air, except pyrolysis which is carried out in ultrahigh purity argon atmosphere from Matheson (USA).

(b) Fiber Drawing and Pyrolysis

TTCSZ/PAA hybrid fibers were prepared via a sol-gel process (FIG. 1). 10 wt % of DCP initially dissolved in TTCSZ formed a solution. PAA was initially mixed with deionized water (PAA to di-water wt. ratio 4:1) and stirred until the mixture turned completely into a transparent gel. The TTCSZ solution was then added to the gel (TTCSZ solution to PAA wt. ratio 1:1). After complete mixing by stirring, the PAA/TTCSZ/water system formed a piece of white slurry with a viscosity measured to be about 250 P (Poise) or 25 Pa·s. The overall ratio between TTCSZ:DCP:PAA was 45:5:50 wt %. The fiber drawing process was carried out by hand drawing in open air. The hybrid fibers can be conveniently drawn directly from the slurry using metal rods, spatulas or tweezers onto aluminum boats for crosslinking process. Then the fibers are dried and crosslinked in a low temperature oven at 160° C. for 24 hours in air. The aluminum boats are simply hand crafted with aluminum foil which have several advantages to be applied in this process. The aluminum foil is chemically and mechanically stable as a supporter that does not introduce extra impurities in low temperature open-air environment; the shrinkage of the hybrid fibers during crosslinking process can be well controlled by the boat; the scale of the boat can be determined by the size of the oven. Fibers are collected from the aluminum boat after crosslinking, then relocated and wrapped on a small boat or rod support made with ceramics or quartz for high temperature pyrolysis.

The polymer-to-ceramic transformation was performed at three different temperatures (600, 700 and 900° C.). The fibers on support were mounted on another alumina boat and heated from room temperature to target temperature at heating rate of 2° C./min under argon.

(c) Characterization

Surface morphology of the fibers at each stage was investigated by scanning electron microscopy (EVO MA10, ZEISS, Germany).

Raman spectroscopy was collected from LabRAM ARAMIS Raman spectrometer (LabRAM HORIBA Jobin Yvon, USA) using a HeNe laser (633 nm) as an excitation source.

Fourier-transform infrared spectroscopy (FT-IR) spectra was obtained from Spectrum 400 FT-IR spectrometer (Perkin Elmer, Waltham, MA) on a diamond crystal top plate of an ATR accessory (GladiATR, Pike Technologies, USA).

Viscosity measurement was performed on Brookfield DV-II+Pro viscometer (Brookfield Engineering, USA) using CEP-40 and CEP-52 cone for pure TTCSZ and TTCSZ/PAA, respectively. 0.5 mL slurry was used with 25-200 rpm rotation rate at 37° C. for the measurement.

X-ray photoelectron spectroscopy (XPS) was performed by PHI Quantera SXM (ULVAC-PHI, Japan). Depth-profiling was applied for 15 mins via Ar ion-beam.

Solid-state $^{13}C$ MAS, CP MAS, and $^{29}Si$ MAS NMR spectra were recorded on a Bruker AVANCE 300 spectrometer (B0=7.0 T, $v_0(^1H)$=300.29 MHz, $v_0(^{13}C)$=75.51 MHz, MHz, $v_0(^{29}Si)$=59.66 MHz) using either 4 mm or 7 mm Bruker probes and spinning frequencies of 10 or 5 kHz. $^{13}C$ CP MAS experiments were recorded with ramped-amplitude cross-polarization in the $^1H$ channel to transfer magnetization from $^1H$ to $^{13}C$. (Recycle delay=3 s, CP contact time=1 ms, optimized $^1H$ spinal-64 decoupling). Single pulse $^{13}C$ and $^{29}Si$ NMR MAS spectra were recorded with recycle delays of 30 and 60 s respectively. Chemical shift values were referenced to tetramethylsilane for $^{13}C$ and $^{29}Si$.

The fiber thermal resistance was analyzed using thermal gravimetric analysis (TGA). The analysis was performed with TG 209 F1 Libra (NETZSCH, Germany) from 100 to 1000° C. (with heating rate of 10° C. $min^{-1}$) in either $N_2$ or synthetic air (with flow of 10 mL $min^{-1}$) for crosslinked, pyrolyzed TTCSZ/PAA and pure PAA samples.

Figure 2:
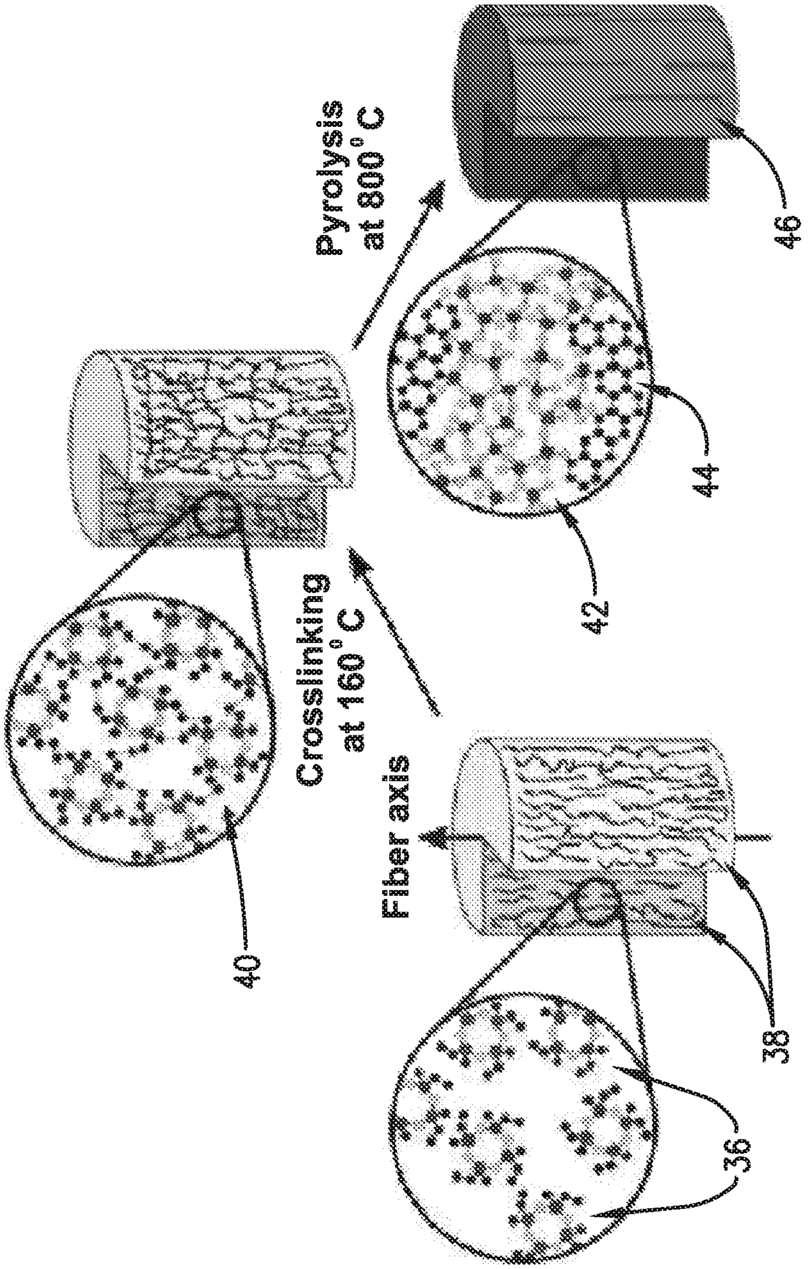
FIG. 2 is a schematic illustration of fiber crosslinking and pyrolysis process wherein TTCSZ is the main PDC fiber precursor, and where PAA plays a fiber template role in the hybrid system.

FIG. 2 is a schematic illustration of fiber crosslinking and pyrolysis process wherein TTCSZ 36 is the main PDC fiber precursor, and where PAA 38 plays a fiber template role in the hybrid system. TTCSZ molecules are embedded in PAA rigid environment that can be crosslinked at elevated temperature (crosslinked TTCSZ 40). Within the fibers, PDC nano-domain structures 42, including free carbon 44, are formed after pyrolyzed at even higher temperature. Surface porosity 46 is also observed on the ceramic fibers.

Results and Discussion (a) Characterization of the Hybrid Fibers

Figure 3A:
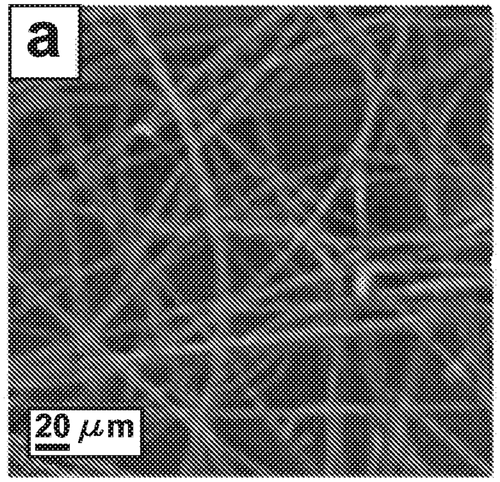
FIG. 3A is an SEM image of hand spun TTCSZ/PAA hybrid fibers pyrolyzed at 600° C.
Figure 3B:
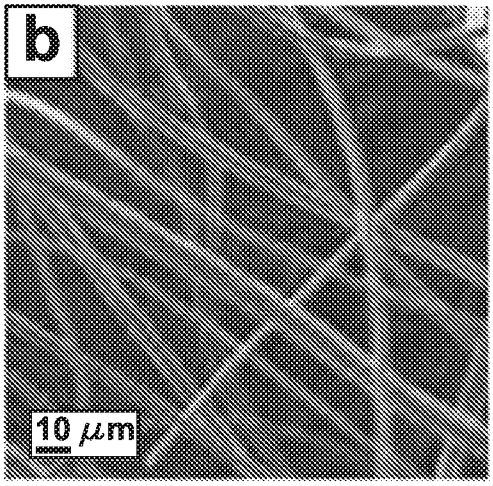
FIG. 3B is an SEM image of hand spun TTCSZ/PAA hybrid fibers pyrolyzed at 700° C.
Figure 3C:
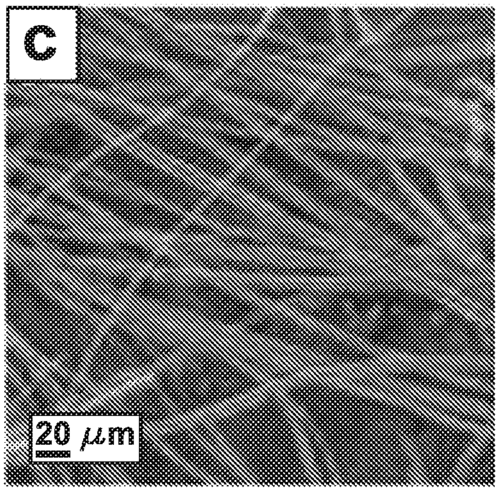
FIG. 3C is an SEM image of hand spun TTCSZ/PAA hybrid fibers pyrolyzed at 800° C.

A series of characterizations was carried out to determine the properties of as pyrolyzed hybrid PDC fibers. SEM images of the pyrolyzed hybrid fibers are given in FIGS. 3A, 3B, and 3C, which were pyrolyzed at 600° C., 700° C., and 800° C., respectively. It is confirmed by SEM that hand-spun fibers have a diameter range of 1~10 μm, with an average diameter about 5 μm. The pyrolyzed fibers are considerably uniform in diameter and porous at the surface. When magnified, fiber surface porosity is noticeable.

The chemical composition of PDC hybrid fibers are determined by XPS depth-profiling survey scans and the results are listed in Table 1.

TABLE 1

| Combustion analysis of samples in weight percentage | | | | | |
|---|---|---|---|---|---|
| Pyrolysis | Element weight percentage (wt. %) and Formula | | | | |
| Temperature (° C.) | C | Si | O | N | Formula |
| 700 | 34.8 | 58.4 | 5.9 | 0.8 | $SiO_{0.18}C_{1.39}$ |
| 800 | 73.3 | 14.8 | 11.6 | 0.4 | $SiO_{1.37}C_{11.6}$ |

The presence of oxygen and loss of nitrogen are discussed in the following sections. The existence of "free carbon" was confirmed by Raman spectroscopy. Viscosity was shown to improve 200 times after mixing with PAA which enhanced spinnability. Carbon G-band (~1595 $cm^{-1}$) showed the existence of graphitic $sp^2$ carbon structure in the fibers, while D-band (~1340 cm-1) represents a large amount of disordered carbon. Specifically, D4- and D3-bands indicate the existence of $sp^2$-$sp^3$ bonds and amorphous carbon in the fibers. Carbon peaks are relatively weaker (high fluorescence) for the fibers pyrolyzed at 600° C. indicating less free carbon. For the higher pyrolysis temperature, free carbon amount is significantly increased. Correspondingly, graphitic carbon is increased with the increase of pyrolysis temperature, while the amount of amorphous carbon is decreased. Because Si—C bonds are $sp^3$, stronger D1, D4-bands in 700 sample confirms higher $SiO_2C_2$ and $SiO_3C$ composition discussed below with the NMR analysis. Raman spectra of pure TTCSZ samples were also obtained to find out the contribution of PAA to the pyrolyzed fibers. The free carbon amounts are apparently raised with incorporation of PAA at initial stage by comparing the intensity of the carbon peaks. Further analysis was performed on bonding types and molecular structures. NMR spectroscopy investigation was performed on the samples at each pyrolysis temperature. $^{29}$Si MAS NMR spectrum of the sample heat-treated at 600.0 shows components at ~−20 ppm, ~−65 ppm and ~−110 ppm suggesting tetrahedrally coordinated Si in $SiO_2C_2$, $SiO_3C$ and $SiO_4$ species typical of mixed silicon oxycarbide units. It should be noticed that part of the signal at ~−10 ppm could also correspond to $SiN_2C_2$ environments but probably in small proportions. This point will be further discussed below. The strong intensity of $SiO_3C$ signal indicates a significant amount of C bonded to Si atoms and correspondingly less free carbon, this result well matches with the Raman data. When increasing the pyrolysis temperatures, the fractions of mixed silicon oxycarbide units decrease: $SiO_3C$ peak greatly decreases and $SiO_2C_2$ peak disappears completely. $SiO_3C$ peak further decreases at 800° C. and leaving most of Si atoms in silica tetrahedral form.

$^{13}$C CP MAS NMR results show a clear free carbon peak around 130 ppm for both 600 and 700° C. No remaining vinyl groups are observed after pyrolysis suggesting a complete polymerization into aliphatic carbon while a strong Si—C peak is detected at 600° C. which drastically decreases at 700° C.

Further NMR spectra were recorded from TTCSZ/PAA hybrid fibers and pure TTCSZ powders samples pyrolyzed at 700° C. to investigate the effect of PAA on the structure of the final product. From the comparison, pure TTCSZ at 700° C. shows a spectrum very close to TTCSZ/PAA at 600° C. As it has been already shown in Raman analysis, either incorporation of PAA or a rising in pyrolysis temperature will ultimately result in a structure with elevated "free carbon" content and decreased Si—C bonds. This is also confirmed by $^{13}$C CP MAS NMR data showing increased "free carbon" content and decreased Si-CHx signals in TTCSZ/PAA hybrid sample compared to pure TTCSZ.

XPS analysis was applied to determine the bonding type from survey scan and high-resolution scan of O1s, C1s, Si2s, Si2p and N1 s peaks in each sample. From the survey scan, N1 s peak disappears after pyrolysis above 600° C. High resolution scans of major peaks reveals the merging of different signals, such as Si—C peaks at ~102.0 eV in Si2p scan and ~284.6 eV in C1s scan. $SiO_2C_2$, $SiO_3C$ and $SiO_4$ components can be obtained from hybrid fibers pyrolyzed at 600° C. in agreement with the NMR results. From high-resolution C1s scan, the C—Si component is continuously decreased leading to relative increase in C—C as pyrolysis temperature increases. This result also matched the FT-IR spectra.

(b) Spinnability

Initial attempts were made to draw fibers directly from pure liquid TTCSZ. The rapid crosslinking was observed at about 125.0 with 10 wt. % crosslinking initiator DCP and completely transformed TTCSZ liquid into a hard bulk, without an intermediate viscous status that can initiate spinning process. The failure was due to two main reasons: low viscosity and cyclic structure of TTCSZ. PAA was introduced to the initial fiber drawing stage before crosslinking to improve spinnability of TTCSZ. Viscosity measurement showed low viscosity (~0.1 Pa·s at 37° C.) for liquid TTCSZ with 10 wt. % DCP. After mixing with PAA, viscosity was raised more than 200 times to about 25 Pa·s at shear rate of 25 rpm (or 50 cm $s^{-1}$) which met the requirement for sol-gel spinning (>10 P). Besides, $^{13}$C CP MAS NMR showed broad signals (suggesting low mobility) of —CH(COOH)—CH2-species which is responsible for enhanced spinnability.

(c) Crosslinking and Pyrolysis Behavior

Investigation of crosslinking behavior is essential since the final content of PDC fibers is largely determined by the bonds formed during crosslinking stage. FT-IR analysis were obtained with main bands characteristics of raw PAA fibers, pure PAA fibers heated at 160° C., and TTCSZ/PAA hybrid raw, crosslinked and pyrolyzed fibers. FT-IR is mainly used to investigate the crosslinking behavior of the precursors. The changes between the precursor spectra and the crosslinked spectra reveal a critical loss of hydrogen and nitrogen during crosslinking. The excessive oxygen content is possibly imported by the initiator, adsorbed from the air or introduced during reaction with water (discussed below). Moreover, the majority of organic moieties (methyl and vinyl groups) are eliminated during this process along with the crosslinking evidence.

NMR on raw and crosslinked samples supports FT-IR results. Both $^{13}$C MAS and $^{13}$C CP MAS NMR were obtained for raw fibers to determine, respectively, highly mobile components (TTCSZ) and rigid environments (PAA). Before crosslinking, both $^{29}$Si and $^{13}$C MAS spectra showed narrow signals indicating high mobility species: $^{29}$Si peaks are mainly observed around −35 ppm, a position significantly different from the initial TTCSZ+DCP solution showing signals at −14.7 ppm and −17.5 ppm characteristic of 6-ring 2,4,6-trimethyl-2,4,6-trivinylcyclotrisilazane and 8-rings silazane TTCSZ, respectively. Signals around −33 ppm are indeed reported for 1,3,5,7-tetravinyl-1,3,5,7-tetracyclotetrasiloxane. This strongly suggests a significant oxidation of the silazane rings into siloxanes, possibly due to the addition of water with PAA. Nonetheless, additional minor signals are still present around −17 ppm, indicating that silazane bonds are still present.

At this point, from the strong evidence obtained from NMR analysis, two different hypotheses are proposed here to explain the loss of nitrogen before pyrolysis:

(1) A large amount of the nitrogen loss may be addressed to the pre-spinning mixing stage. —NH— may react with $H_2O$ molecules and form $NH_3$ inducing nitrogen loss before crosslinking.

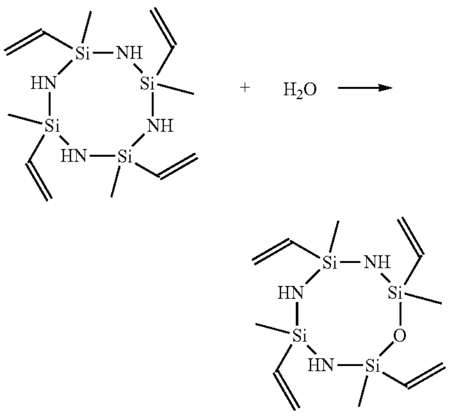

(2) During crosslinking stage, the hydrosilylation reaction takes place. This reaction is induced by heating and happens at relative lower temperature as low as 120° C.

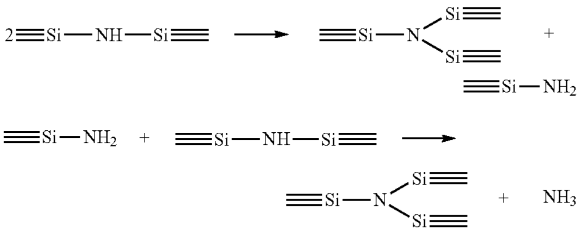

As a result, TTCSZ may be oxidized to 1, 3, 5, 7-tetramethyl-1, 3, 5, 7-tetravinyl-cyclotetrasiloxane. Then methylvinyl radical reaction will take place initiated by DCP during crosslinking stage. The reaction can be shown as follows:

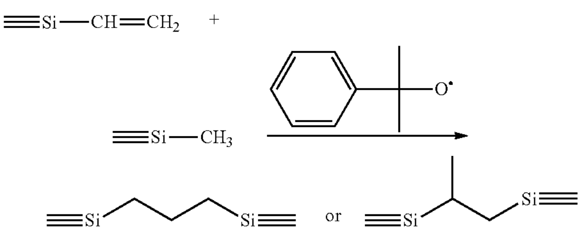

And the reactions are expected to take place on all four vinyl groups attached to four cyclic silicon atoms and form into network structure. However, this crosslinking reaction may not be complete due to the limited mobility after the network formation.

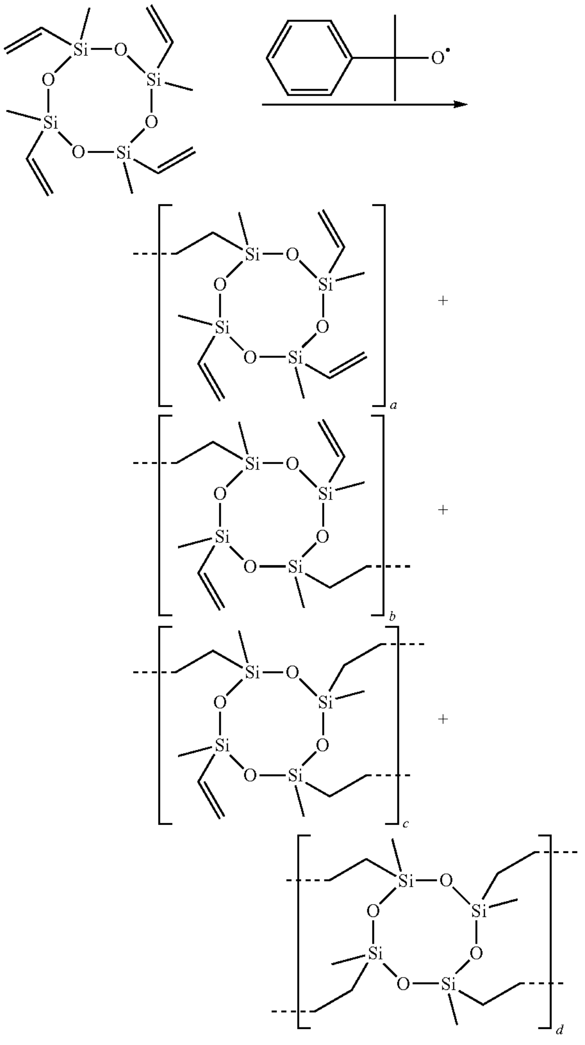

After crosslinking at 160° C., broader peaks indicate less mobility due to the conversion of Vi-(Me)$SiO_2$ to —$CH_2$-(Me)$SiO_2$. However, high consistency between raw and 160° C. $^{13}C$ CP MAS suggests very weak PAA crosslinking activities at 160° C.

Polymer-to-ceramic conversion process is revealed at 600° C. which is supported by Raman analysis showing free carbon bands in FIG. 3. However, comparison of FT-IR results between crosslinked fibers and pyrolyzed fibers suggests that the conversion is not complete until 800° C. The decomposition of remaining organic groups is observed at pyrolysis temperature range (600-800° C.).

(d) Thermal Resistance

The thermal behavior of the hybrid fibers is studied with thermogravimetric analysis using powder samples in either $N_2$ or air and the results are shown in (FIG. 10). The significant weight loss of pure PAA fibers started at a temperature as low as 200° C. The hybrid fibers pyrolyzed at 800° C. showed a good thermal stability up to 1000° C. with weight loss of 4.5 wt. %. While the TGA curve of crosslinked hybrid samples gives a rough idea of ceramic yield of this TTCSZ/PAA combination. The estimated yield in of crosslinked sample is about 48% which well matches with the recorded ceramic yield. TGA result of pure PAA in air, associated with NMR results, indicates that PAA in the hybrid system mainly acts as a fiber template (rigid environment mentioned above) in the spinning process and does not participate in crosslinking ($^{13}C$ CP MAS NMR), and provides a small amount of excessive carbon after pyrolysis.

Conclusion

Carbon-rich SiOCN fibers have been are synthesized and characterized, for the first time, from commercially available 1,3,5,7-tetramethyl-1,3,5,7-tetravinyl-cyclotetrasilazane and PAA forming a hybrid preceramic polymer precursor. The sol-gel process, fiber drawing and crosslinking processes are easily conducted in open air. Linear PAA molecules provide a rigid body during fiber drawing process and provide excessive free carbon in the final fiber product. As-spun fibers are revealed oxygen rich which may be due to the presence of water during mixing stage, still, providing intrinsic thermal stability at 1000° C.

The fibers produced are uniform in diameter with a small degree of surface porosity (without large defects) observed during the characterization even with hand spinning. The spinning process and technique developed in this work successfully produced fibers from an unspinnable silazane with acceptable compromise in composition and properties, but greatly reduced processing costs and environmental requirements. This hybrid technique is recommended to lab scale early production of new types of ceramic fibers. High productivity of this technique can easily satisfy various characterization needs with minimum setup requirements. The fiber products are suggested as reinforcement for CMC materials.

The fibers' structure and properties may be improved by altering synthesis conditions. Oxygen content can be controlled from the initial fiber drawing stage to crosslinking stage: instead of mixing TTCSZ/PAA in aqueous environment, melt-spinning is applicable to avoid the reaction between TTCSZ and water molecule, where this process can be conducted in a glovebox; the crosslinking environment can be adjusted to inert atmosphere such as $N_2$ or Ar to avoid fibers from direct contact with $O_2$; crosslinking method can also be altered to irradiation (gamma or electron), photo (UV) or ionic crosslinking instead of thermal crosslinking.

Example 2

In this example, electrospun SiOC fibers formed from siloxanes and polyvinylpyrrolidone (PVP) hybrid precursor are prepared. As described herein, 1,3,5,7-tetravinyl-1,3,5,7-tetramethylcyclotetrasiloxane (referred as 4-TTCS), Pt-1,3,5,7-tetravinyl-1,3,5,7-tetramethylcyclotetrasiloxane complex (2% Pt in 4-TTCS, referred as Pt-TTCS), 1,3,5-trivinyl-1,3,5-trimethylcyclotrisiloxane (referred as 3-TTCS) and 1,3-divinyltetramethyldisiloxane (referred as DTDS) can be used as SiOC precursors. These precursors were chosen based on preliminary electrospinning testing, as shown in Table 1. As shown in Table 2, 1,3,5,7-tetravinyl-1,3,5,7-tetramethylcyclotetrasiloxane (TTCSZ), vinyl terminated polydimethylsiloxane, and poly(dimethylsilane) were not suitable preceramic polymer materials to form hybrids with PVP for electrospinning.

TABLE 2

Silicon compounds electrospinning testing.
Silicon Compounds Electrospinning Testing

| Product Code | Chemical Name | Status | E-Spin with PVP in IPA |
|---|---|---|---|
| SIT7900.0 | 1,3,5,7-tetravinyl-1,3,5,7-tetramethyl-cyclotetrasiloxane | Liquid | Works good |
| SIT7899.0 | 1,3,5,7-tetravinyl-1,3,5,7-tetramethyl-cyclotetrasilazane | Liquid | Doesn't work, fiber collapse |
| SIT8737.0 | 1,3,5-trivinyl-1,3,5-trimethyl-cyclotrisiloxane | Liquid | Works fine |
| SIP683 2.2 | 2% platinum-cyclovinylmethyl-siloxane complex | Liquid | Works fine, bad yield |
| SID4613.0 | 1,3-divinyl-tetramethyl-disiloxane | Liquid | Works, low yield and very thin fibers |
| DMS-V 21 | vinyl terminated Polydimethylsiloxane, 100 cst | Liquid | Doesn't work, bad mixing with PVP |
| PSS-1 M01 | poly(dimethylsilane) | Powder | Doesn't work, won't dissolve |

Electrospinning is one of the earliest developed methods for synthesizing micron to submicron-sized fibers. These fibers have potential applications in storage, catalysis, filtration, delivery and so on. Synthesizing electrospun ceramic fibers may innovate the high-temperature applications with great stabilities.

The preparation of highly porous SiOC fibers via electrospinning of siloxanes and polyvinylpyrrolidone (PVP) hybrid precursors are described herein. PVP is introduced as a co-spin agent to provide enough viscosity of the spinning precursor. The prepared fiber mats are crosslinked (in air) and pyrolyzed (in Ar at 800° C.) for polymer-to-ceramic conversion, then characterized by scanning electron microscopy (SEM), Raman spectroscopy, Fourier transform infrared spectroscopy (FTIR), X-ray photoelectron spectroscopy (XPS), nuclear magnetic resonance (NMR) and thermogravimetric analysis (TGA). The influences of initial preceramic siloxane compositions on final (pyrolyzed) ceramic compositions and properties are investigated.

The ceramic fiber mats or fabric show extreme resistance to damage exposure from acetylene torch (~expected temp 2500C) in open air for extended periods of time. The fiber mat could be used as reinforcement material for high temperature ceramic matrix composite applications.

Materials and Processing (1) Material

Preceramic silicon oligomers were purchased from Gelest (USA). Polyvinylpyrrolidone (PVP, average $M_w \approx 1,300,000$) and dicumyl peroxide (DCP) were available from Sigma-Aldrich (USA). Isopropanol was obtained from a commercial source. Ultrahigh purity compressed argon gas is supplied by Matheson (USA) as a pyrolysis atmosphere.

As seen blow, preceramic silicon oligomers are very similar in the initial structures that 4-TTCS, Pt-TTCS and 3-TTCS have an overall Si to 0 ratio of 1:1, while the ratio is 2:1 for DTDS.

4-TTCS

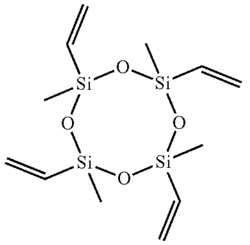

Pt-TTCS

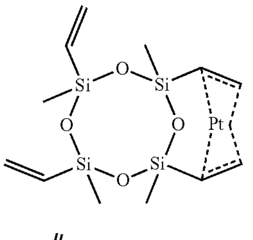

3-TTCS

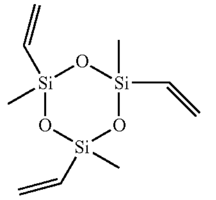

DTDS

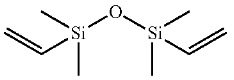

(2) Electrospinning Setup

Figure 4:
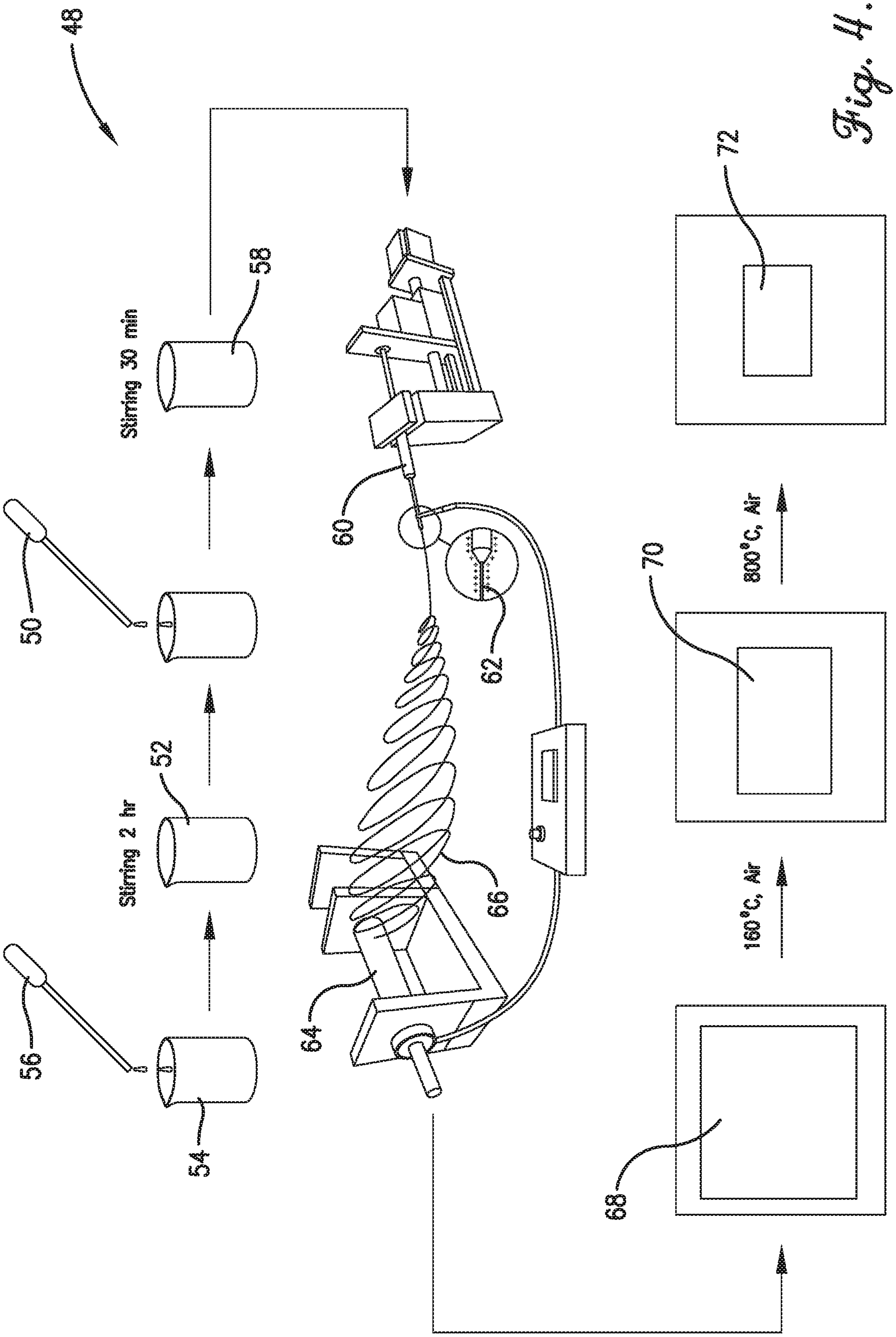
FIG. 4 is a schematic illustration of the major components and steps of the electrospinning setup.

The electrospinning setup used in this work was designed and assembled in the lab. There were four major parts for the spinning setup as shown in FIG. 4: (1) spinning solution feeder was made of a syringe mount on a linear slide stroke with stepper motor, (2) fiber collector was a rotating aluminum cylinder driven by a motor, (3) high voltage power supply (30 kV maximum) and (4) control system by Arduino, sensors and motor controller.

(3) Preparation of Raw Fibers

Initially, siloxanes were mixed with 1% of DCP as a crosslinking initiator until DCP was fully dissolved into liquid siloxanes except for Pt-TTCS (Pt acts as the crosslinker). 800 mg of PVP powder was dissolved in isopropanol alcohol (IPA) with the approximate weight ratio of PVP: IPA=1:9 via magnetic stirring at 300 rpm for 4 hours. Once a uniform solution was formed without visible particle and air bubbles, preceramic siloxanes were added into solution with 1 hr extra stirring. The siloxane/PVP hybrid gel was loaded to a 10 ml syringe with a flat metallic needle and fed at the speed of 5 $ml\cdot hr^{-1}$. The needle was subjected to the 15 kV positive output of the high-voltage power supply while the ground was connected to the fiber collector. The distance between the needle tip and the collector was set to 20 cm. Raw fiber mat of size ~20×20 $cm^2$ was produced.

(4) Crosslinking and Pyrolysis of Fiber Mats

The as-spun fiber mats were dried in the open air for 24 hours, then transferred into the low-temperature oven for crosslinking at 160° C. for 24 hours. Crosslinked mats were cut into smaller squares to fit into the alumina ceramic boats that were used for the following pyrolysis. The pyrolysis was performed at a heating rate of 2° $C.\cdot min^{-1}$ and 30 min annealing at the target temperature in the tube furnace with argon gas as the protection environment. Target temperatures of 400, 600, 800 and 1000° C. were selected to study the polymer-to-ceramic conversion and evolution of microstructures of the fibers at different temperatures. SiOC ceramic fibers mats were synthesized after pyrolysis.

Characterization

Characterization techniques are performed equally to raw, crosslinked and pyrolyzed samples to determine the chemical, mechanical, surface and compositional changes if the characterization is sensitive to the samples. Fiber diameter and surface morphology are obtained from Scanning Electron Microscopy (SEM, EVO MA10, ZEISS, Germany), corresponding characteristics of fiber cross-section is observed after Focus Ion Beam (FIB) treatment in the SEM. Compositional analysis is carried out by the X-ray Photoelectron Spectroscopy (XPS, K-alpha XPS/UPS Photoelectron Spectrometer, ThermoFisher, USA). XPS survey and high-resolution scans are performed on fiber mats for 10 s acquisition time with depth-profiling via 2 min Ar sputtering at 3 keV.

The development of the chemical bonding is determined by various techniques, such as Raman spectroscopy (ARAMIS Raman spectrometer, LabRAM HORIBA Jobin Yvon, USA), Fourier-Transform Infrared spectroscopy (FTIR, Spectrum 400 FT-IR spectrometer, Perkin Elmer, USA) and Nuclear Magnetic Resonance spectroscopy (NMR, AVANCE 300 spectrometer, Bruker, USA). Raman spectrum is collected using a HeNe laser (632 nm) specifically for the analysis of "free carbon" in the pyrolyzed system; FTIR is performed using attenuated total reflectance (ATR) setup and collected IR spectrums ranging from 500-3500 nm with 64 cumulation time that provides the information of functioning groups at each stage; NMR reveals a more detailed bonding situation by different elements in each sample.

Results and Discussion (1) Microstructure

Figure 5A:
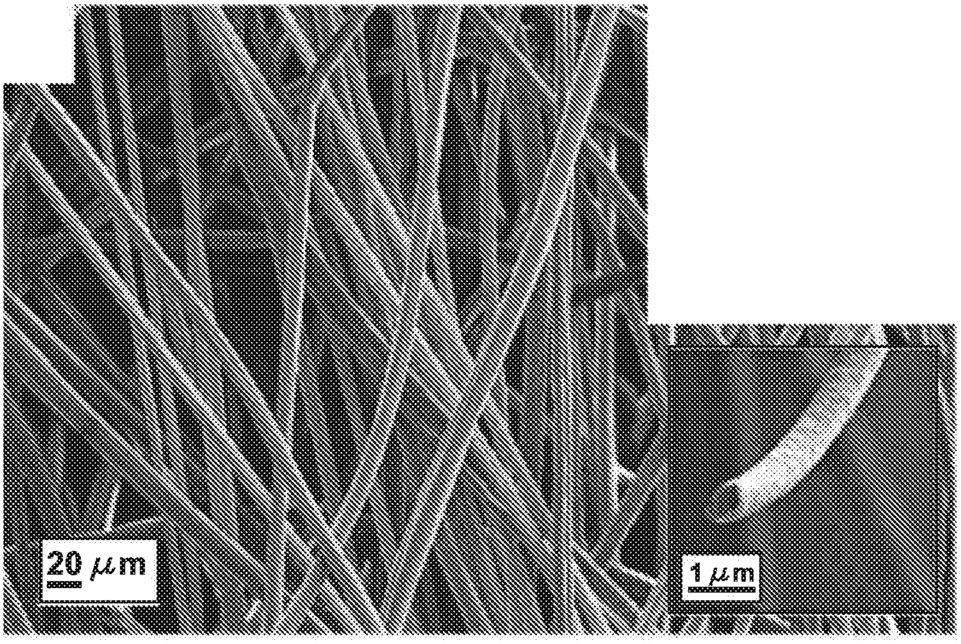
FIGS. 5A-F are SEM images of electrospun fiber mats.
Figure 5B:
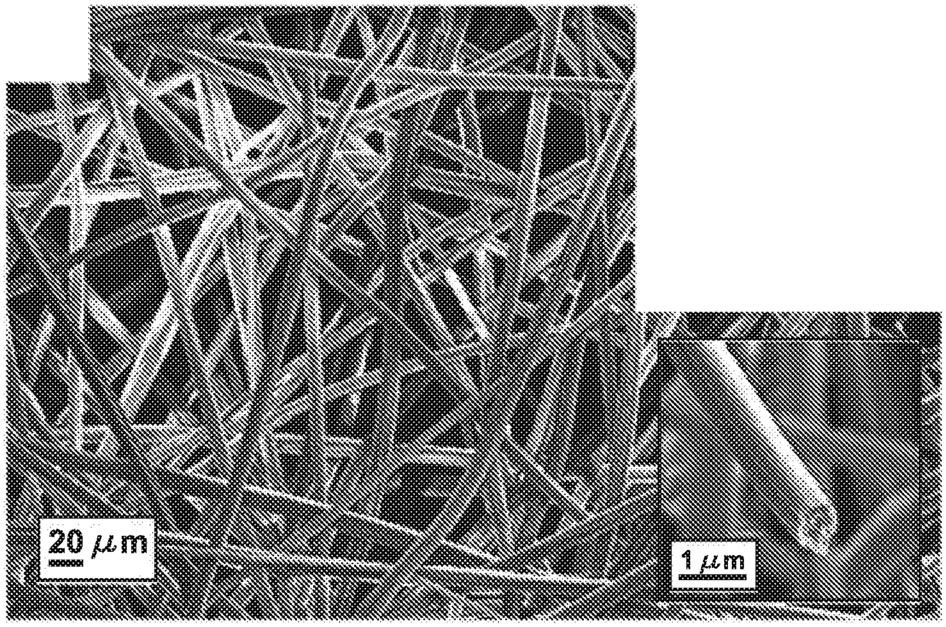
Figure 5C:
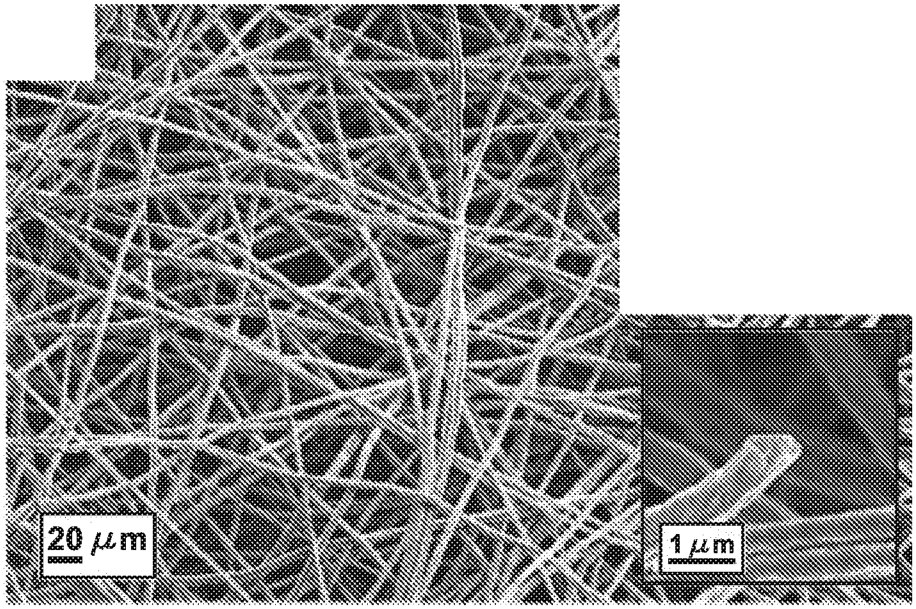
Figure 5D:
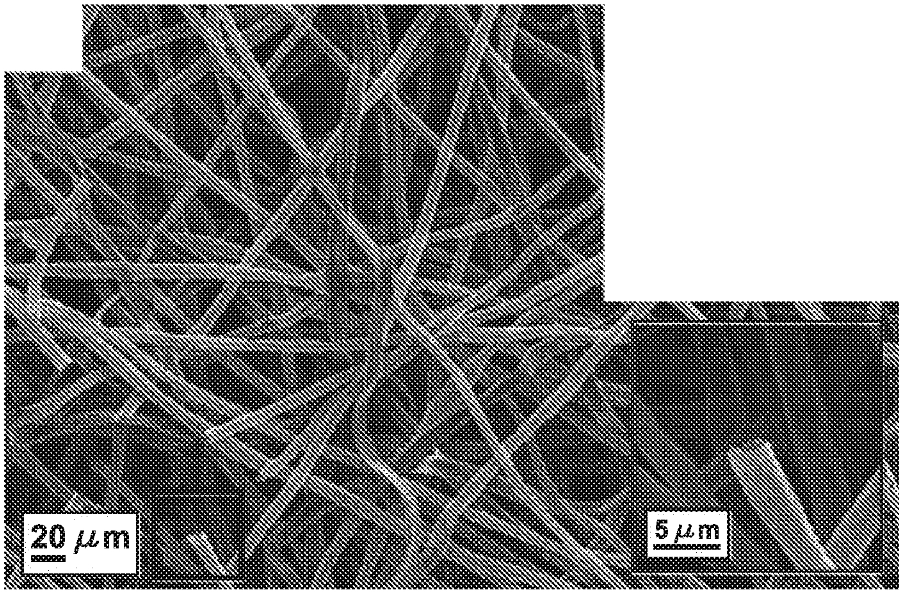
Figure 5E:
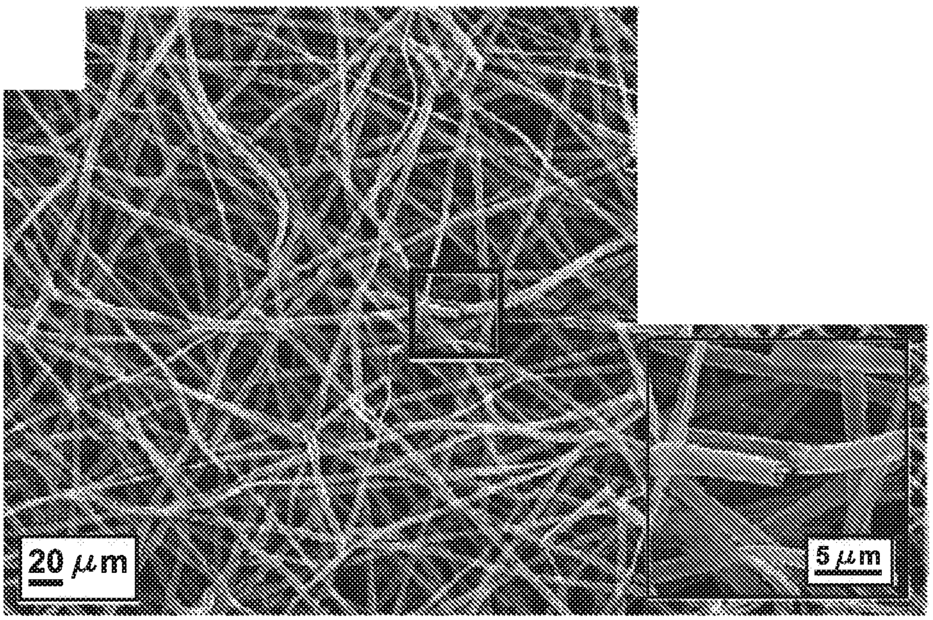
Figure 5F:
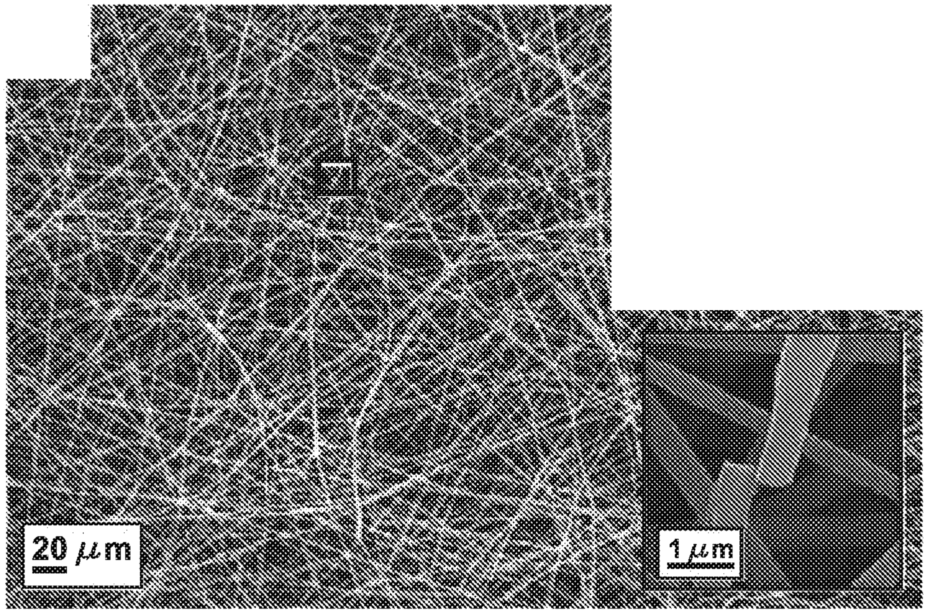
Figure 5G:
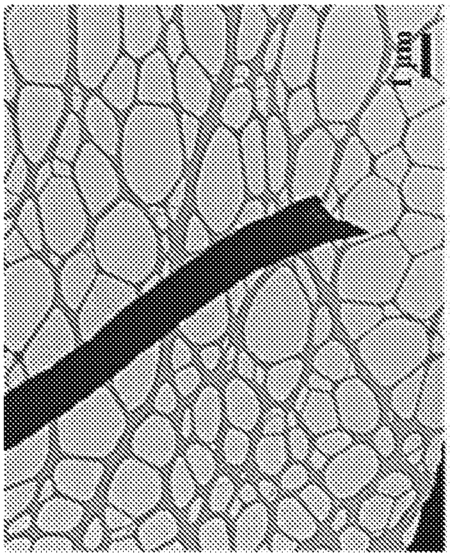
FIGS. 5G-J are TEM images of pyrolyzed 4-TTCS/PVP, Pt-TTCS/PVP, 3-TTCS/PVP and DTDS/PVP, respectively.
Figure 5H:
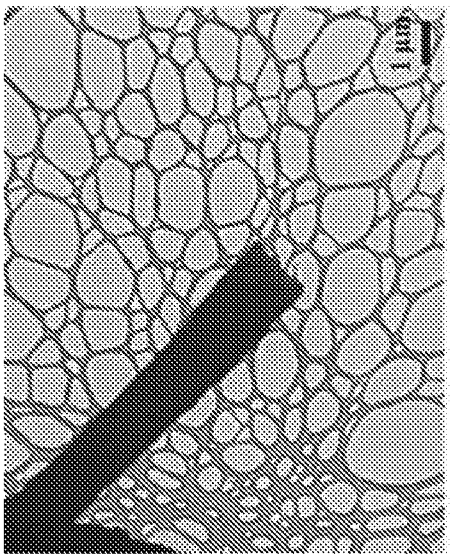
Figure 5I:
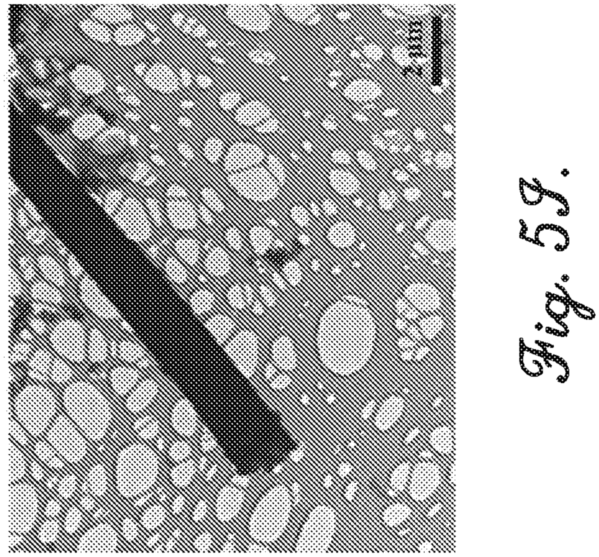
Figure 5J:
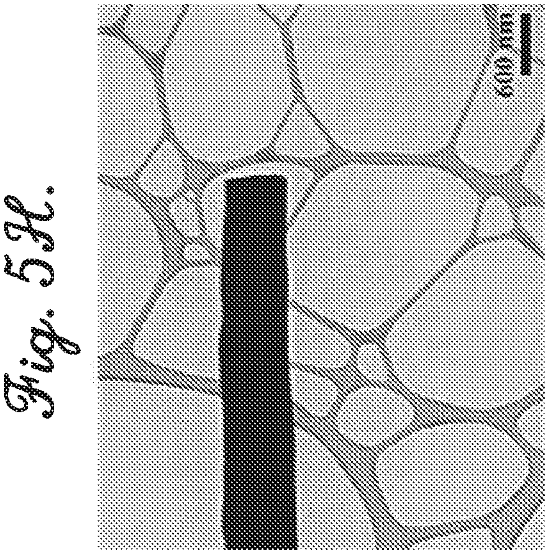

SEM images of crosslinked and pyrolyzed fibers are obtained first and presented in FIGS. 5A-5F. In particular, FIG. 5A depicts raw fibers, FIG. 5B crosslinked fibers, FIG. 5C pyrolyzed 4-TTCS/PVP fibers, FIG. 5D pyrolyzed PT-TTCS/PVP fibers, FIG. 5E pyrolyzed 3-TTCS/PVP fibers, and FIG. 5F pyrolyzed DTDS/PVP fibers. FIGS. 5G-5J are TEM images of pyrolyzed 4-TTCS/PVP, Pt-TTCS/PVP, 3-TTCS/PVP and DTDS/PVP, respectively. The fibers are initially drawn under the same conditions (15 kV, ~20 cm distance between needle and collector, same collector rotating speed), however, it is very clear that different Si compounds are leading to different features of pyrolyzed fibers. First of all, all samples are uniform in diameter within an individual fiber, but the average fiber diameters are greatly changing from about 3-5 μm (for 4-TTCS and Pt-TTCS) to about 1-3 μm (for 3-TTCS) and about 0.5 μm (for DTDS). It seems like that the larger silicon compound (with higher average molecular weight) derives thicker electrospun fibers for these cyclic types of preceramic precursors. It is also noticeable that DTDS/PVP derived fibers are smoother (or less porous) on the fiber surface when compared to the other three samples, while cyclic precursors derived fibers are translucent that indicates the hollow features of the fibers (which are also captured from the cross-section view).

Theoretically, the formation of these hollow structured fibers is certainly related to the spinning process. There are reports on the core-shell structure derived (via post heat-treatment) hollow fiber mats by electrospinning, where the core-shell structure can be formed if two different polymers are extruded simultaneously with two coaxial capillaries.

However, in our case, the spinning solution is prepared by the mixing of preceramic silicon polymer, linear PVP polymer (as spinning agent) and solvent. The as-prepared solutions are electrospun using a single syringe needle. Hence, we suspect the core-shell structure is formed during the spinning process because of the molecular weight difference between preceramic polymers and PVP (~1,300,000 g $mol^{-1}$). The smaller or shorter molecules have higher mobility when applied to the same electrostatic force that may be pulled out of the more rigid PVP environment and form such structures. The holes are then formed during heat-treatments (crosslinking and pyrolysis). Further investigation of this phenomenon is necessary with the assistance of other characterization techniques.

(2) Compositional Analysis

Raman spectroscopy was applied to determine the carbon bonding condition and corresponding microstructures. All samples except Pt-TTCS/PVP show obvious carbon D band and G band absorptions in the spectrums that indicate "free-carbon" or "nanodomain" structure may exist. The relative intensities of D and G bands are 1.01~1.14 that suggests the similar amount of amorphous $sp^3$ carbon and graphitic $sp^2$ carbons in the systems. Pt-TTCS/PVP sample shows strong fluorescence under both visible (HeNe at 632 nm) and IR (Diode at 785 nm) laser source that does not show any significant carbon D or G band in the structure. This may be caused by the low C content or existence of Pt in the sample (confirmed by XPS).

The FTIR spectrum of raw, crosslinked and pyrolyzed samples were collected for each type of sample (neat PVP and each PVP/preceramic silicon polymers). The corresponding characteristic peaks are concluded in Table 3 for different preceramic silicon polymers and PVP.

TABLE 3

Characteristic wavenumbers by different chemical groups for each preceramicsilicon polymers and PVP.

| | Wave-number ($cm^{-1}$) | Chemical group | Ref |
|---|---|---|---|
| PVP | 3399 | OH stretching | Kamaruddin 2017 |
| | 2918 | $CH_2$ asymmetric stretching | Kamaruddin 2017 |
| | 1648 | C—O stretching | Kamaruddin 2017 |
| | 1422 | CH bending | Kamaruddin 2017 |
| | 1288 | $CH_2$ wagging | Kamaruddin 2017 |
| | 1018 | $CH_2$ rock | Kamaruddin 2017 |
| | 570 | N—C═O bending | Kamaruddin 2017 |
| 4-TTCS | 3057, 3016 | Si—CH═$CH_2$ (CH asymmetric stretching) | Nyczyk 2011 |
| | 2964 | Si—$CH_3$ (CH symmetric stretching) | Nyczyk 2011 |
| | 1598 | Si—CH═$CH_2$ (C═C stretching) | Nyczyk 2011 |
| | 1408 | Si—$CH_3$ (C—H asymmetric bending) | Nyczyk 2011 |
| | 1260 | Si—$CH_3$ (C—H symmetric bending) | Nyczyk 2011 |
| | 1059 | Si—O—Si asymmetric stretching | Nyczyk 2011 |
| | 1007, 959 | Si—CH═$CH_2$ (CH out-of-plane bending) | Nyczyk 2011 |
| | 789, 746 | Si—$CH_3$ (Si—C deformation vibration) | Zhang 2015 |
| | 682, 645 | Si—$CH_3$ (Si—C stretching) | Nyczyk 2011 |
| 3-TTCS | 2950 | $CH_2$ asymmetric stretching | Burkey 2003 |
| | 1662 | Si—CH═$CH_2$ (C═C stretching) | Burkey 2003 |
| | 1424 | Si—$CH_3$ (C—H asymmetric bending) | Burkey 2003 |
| | 1288 | Si—$CH_3$ (C—H symmetric bending) | Burkey 2003 |
| | 1020 | Si—O—Si (Siloxane stretch) | Burkey 2003 |
| | 803, 744 | Si—$CH_3$ ($CH_3$ rock) | Burkey 2003 |

TABLE 3-continued

Characteristic wavenumbers by different chemical groups for each preceramicsilicon polymers and PVP.

| | Wave-number ($cm^{-1}$) | Chemical group | Ref |
|---|---|---|---|
| DTDS | 2954 | $CH_2$ asymmetric stretching | Dvornic 1994 |
| | 1660 | Si—CH═$CH_2$ (C═C stretching) | Dvornic 1994 |
| | 1423 | Si—$CH_3$ (C—H asymmetric bending) | Dvornic 1994 |
| | 1288 | Si—$CH_3$ (C—H symmetric bending) | Dvornic 1994 |
| | 1058 | Si—O—Si (Siloxane stretch) | Dvornic 1994 |

For the neat PVP samples, the comparison between raw and heated sample (Neat PVP XL) shows all the retained main peaks for PVP (C—O at ~1650 cm-1, C—H at N—C═O) suggest no obvious crosslinking reaction took place. To confirm this, the high temperature pyrolysis of heat-treated neat PVP in an inert atmosphere was performed. The destruction of fiber mat suggests no or low crosslinking during low temperature heat-treatment. When PVP is mixed with 4-TTCS or Pt-TTCS, very strong peaks (such as, Si—O—Si at ~1059 $cm^{-1}$, Si—CH═$CH_2$ at ~1000 $cm^{-1}$ and Si—$CH_3$ ~750 $cm^{-1}$) that were not involved in neat PVP samples are observed. After crosslinking at 160° C., decrease in Si—CH═$CH_2$ and Si—$CH_3$ peaks indicates a strong crosslinking reaction of TTCS took place. After pyrolysis, the spectrum suggests decomposition of PVP organic components and the retention of Si—O in the system. 3-TTCS samples shows rather different spectrum from similarly structured 4-TTCS samples that the characteristic peaks are less intensive. Tough, similar crosslinking behavior are observed from the decrease of Si—CH═$CH_2$ at 1662 $cm^{-1}$ and Si—$CH_3$ at 1424 and 1288 $cm^{-1}$. Relatively weaker crosslinking evidence is observed in DTDS sample with less obvious changes of Si—$CH_3$ at 1424 and 1288 $cm^{-1}$ after crosslinking. All pyrolyzed samples have strong absorptions at Si—O (~1050 $cm^{-1}$) peak with weaker absorptions at Si—C(~700 $cm^{-1}$) peak. The relative stronger Si—O absorption indicates the more Si—O bonds than Si—C bonds in all samples.

TABLE 4

Elemental composition by XPS.

| Pyrolyzed | Elements (at. %) | | | | Empirical |
|---|---|---|---|---|---|
| samples | Si | C | O | Pt | formula |
| 4-TTCS/PVP | 23.7 | 41.5 | 34.8 | — | $SiC_{1.75}O_{1.47}$ |
| Pt-TTCS/PVP | 41.1 | 13.4 | 44.9 | 0.6 | $SiC_{0.33}O_{1.09}Pt_{0.01}$ |
| 3-TTCS/PVP | 38.4 | 13.8 | 47.8 | — | $SiC_{0.36}O_{1.24}$ |
| DTDS/PVP | 29.0 | 31.8 | 39.2 | — | $SiC_{1.10}O_{1.35}$ |

XPS survey scans are performed on pyrolyzed fiber mats to investigate the compositions of each samples. Elemental compositions (Table 4) of pyrolyzed samples are significantly different for each preceramic polymer. The atomic weight percentage are calculated by integrating the area under critical peaks. It can be concluded that the Pt-TTCS/PVP sample derives highest Si composition (41.1 At. %) with highest 0 (44.9 At. %) and lowest C contents (13.4 At. %). However, 4-TTCS/PVP, that has the same initial structure with Pt-TTCS, end up with highly different final composition with lowest Si (23.7 At. %) and highest C (41.5 At. %). Similarly structured 3-TTCS (6-ring cyclic siloxane) provides similar composition as Pt-TTCS/PVP. DTDS/PVP gives very balanced chemical composition after pyrolysis. As mentioned in the previous section, the Si and O have the same initial atomic percentage in 4-TTCS, Pt-TTCS and 3-TTCS preceramic silicon polymers, and Si:O=2:1 in DTDS. It can be inferred from the pyrolyzed fiber mats that all polymers are oxidized during the heat-treatments.

Si, C, O and Pt (specifically for Pt-TTCS) high-resolution scans are conducted for the same samples to determine the bonding situations of each sample. It is important to determine the bonding types of silicon thus to better estimate the microstructures of the fiber mats. By integrating and curve fitting the Si2p and C1s high-resolution scan curve, conclusions are drawn here: (1) low carbon content result in less Si—C contents that will eventually lower $SiCO_3$ and $SiC_2O_2$ microstructure, and $SiC_2O_2$ might not exist in low C samples; (2) high C samples tend to form higher C—C bonds that may lead to higher "free carbon" domain in the microstructure; (3) low carbon contents in Pt-TTCS and 3-TTCS samples indicate limited contribution of PVP after pyrolysis.

Solid-state NMR spectroscopy is performed on pristine PVP, siloxane/PVP raw, crosslinked and pyrolyzed samples. From the 29Si MAS analysis, both the reserved 8- or 6-units ring structures are revealed for raw samples after spinning and crosslinking. The bulk NMR analysis on the raw and crosslinked samples reveal that thermal crosslinking behavior of siloxane by DCP provides better results than Pt. This is also supported by 29Si MAS of pyrolyzed samples that the Si—C bonding situation (the amount of $SiC_2O_2$ and $SiCO_3$ structures) is most significant in 4-TTCS/PVP samples while it was not detected from Pt-TTCS/PVP samples. Low carbon content in Pt-TTCS/PVP sample is also supported by XPS analysis result.

Conclusion

SiOC fiber mats are synthesized using electrospinning technique from four different preceramic silicon oligomers and PVP hybrid spinning precursors. The electrospinning technique is an efficient and stable technique in synthesizing large size fiber mats. As-spun fiber mats go through two-stage heat-treatment for complete polymer-to-ceramic conversion. During crosslinking and pyrolysis, surface of the fibers changed from smooth surfaces to highly porous surfaces. Different preceramic oligomers derive significantly different final SiOC composition even the initial structures are very similar for 4-TTCS, Pt-TTCS and 3-TTCS that demonstrate the controllability of final compositions.

Conclusions can be made from this research for electrospinning PDC fibers when the precursor is initially unspinnable. Spinning reagents can be added to provide enough viscosity and enable the electrospinning, in the case of this research, PVP is used. Solid state material (can be the spinning reagent) with good solubility (in either aqueous or organic solvent) is required for electrospinning because the fibers are formed by the precipitation of the solid body with the evaporation of the solvent. Therefore, liquid silicon precursors are allowed as long as no chemical reaction occurs with the spinning agent.

Supplemental Testing (1) XPS

Pt4f high-res XPS was recorded from the same fiber mat that the survey scan and other (O1s, C1s and Si2p) high-res was performed. The deconvoluted peaks were shown and marked with corresponding oxidation status at $Pt^0$ (70.9 eV), PtO (72.0 eV) and $PtO_2$ (73.2 eV).

To investigate the compositional changes by exposing the fiber mats to acetylene torch flame for 20 s, XPS survey scan was recorded from all four pyrolyzed samples. The detailed composition is given in Tables 2 and 3, above. From the spectra, 4-TTCS/PVP, Pt-TTCS/PVP and 3-TTCS/PVP samples showed a high consistency before and after heat-treatment. However, a significant drop of C1s is observed in DTDS/PVP sample.

(2) NMR

NMR spectra of as spun fiber mats (in raw and crosslinked forms) were obtained and plotted. Compared to powdered samples, $^{29}Si$ signals and Si—$CH_x$ signals are much weaker and hard to make comparison between different preceramic polymers. PVP shows less or no crosslinking behavior when comparing the pristine PVP raw and XL samples in $^{13}C$ CP MAS spectra.

(3) Nano-Indentation

Nanoindentation was performed on 4-TTCS/PVP fibers to investigate the transverse modulus of the ceramic fibers. The ceramic fiber mat was embedded in hard epoxy resin environment and polished until the fiber mat was revealed on the surface. As a comparison, indentation was performed equally to the epoxy surface. The results are respectively 5.68 GPa and 1.84 GPa, for the fiber and epoxy.

(4) BET Surface Area Analysis

BET surface area analyses were performed on as-spun ceramic fiber mats. $N_2$ was used as analysis adsorptive. The adsorption curves were plotted. As a result, the BET surface area and the adsorption pore sizes are calculated and provided in the Table 5. As seen from the results, the 4-TTCS/PVP sample showed the highest BET surface area.

TABLE 5

BET analysis results.

| Sample | BET surface area ($m^2$ $g^{-1}$) | Adsorption pore size (nm) |
|---|---|---|
| 4-TTCS/PVP | 416.7 | 2.3 |
| Pt-TTCS/PVP | 115.6 | 2.8 |
| 3-TTCS/PVP | 18.3 | 6.2 |
| DTDS/PVP | 9.2 | 5.0 |

We claim:

1. A method of producing ceramic fiber materials comprising:

forming a reaction mixture comprising a liquid preceramic composition and a spinning reagent, the liquid preceramic composition consisting essentially of a crosslinking agent and a siloxane and/or a silazane, the reaction mixture comprising a gel;

spinning preceramic polymer fibers from the gel;

crosslinking the preceramic polymer fibers to form crosslinked preceramic polymer fibers;

pyrolyzing the crosslinked preceramic polymer fibers to form the ceramic fiber materials, wherein the ceramic fiber material comprises free carbon, the pyrolyzing step comprising heating the crosslinked preceramic polymer fibers to a pyrolysis temperature of about 600° C. to about 1000° C. at a rate of about 1° C./minute to about 3° C./minute; and annealing the ceramic fiber material at the pyrolysis temperature for about 5 minutes to about 30 minutes.

2. The method of claim 1, wherein said spinning reagent comprises polyacrylic acid, polyvinylpyrrolidone, and/or polyacrylonitrile.

3. The method of claim 1, wherein the liquid preceramic composition comprises one or more materials selected from the group consisting of 1,3,5,7-tetravinyl-1,3,5,7-tetramethylcyclotetrasiloxane, Pt-1,3,5,7-tetravinyl-1,3,5,7-tetramethylcyclotetra-siloxane complex, 1,3,5-trivinyl-1,3,5-trimethylcyclotrisiloxane, 1,3-divinyltetramethyl-disiloxane, and 1,3,5,7-tetramethyl-1,3,5,7-tetravinyl-cyclotetrasilazane.

4. The method of claim 1, wherein the spinning reagent comprises an organic polymer solution and is prepared by mixing the organic polymer with a solvent in a weight ratio of from about 0.1:1 to about 10:1 to form a gel.

5. The method of claim 4, wherein the solvent comprises water and/or an alcohol.

6. The method of claim 1, wherein the liquid preceramic composition comprises from about 2% to about 25% by weight of the crosslinking agent.

7. The method of claim 6, wherein the crosslinking agent is dicumyl peroxide.

8. The method of claim 1, wherein the reaction mixtures comprises a weight ratio of the spinning reagent to the liquid preceramic composition of from about 1:5 to about 5:1.

9. The method of claim 1, wherein the spinning step comprises a wet spinning, a gel spinning, or an electrospinning process.

10. The method of claim 1, wherein the crosslinking step comprises heating the preceramic polymer fibers to a temperature of from about 100° C. to about 200° C., for about 1 hour to about 48 hours.

11. A method of producing silicon oxycarbide fibers comprising:

forming a reaction mixture comprising a liquid preceramic composition and a spinning reagent, the liquid preceramic composition consisting essentially of a crosslinking agent and a siloxane and/or a silazane, the spinning reagent comprising polyacrylic acid, polyvinylpyrrolidone, and/or polyacrylonitrile, the reaction mixture comprising a gel;

spinning preceramic polymer fibers from the gel using a wet spinning, a gel spinning, or an electrospinning process;

heating the preceramic polymer fibers to form crosslinked preceramic polymer fibers;

pyrolyzing the crosslinked preceramic polymer fibers to form the silicon oxycarbide fibers, wherein the silicon oxycarbide fibers comprise free carbon, the pyrolyzing step comprising heating the preceramic polymer fibers to a pyrolysis temperature of about 600° to about 1000° C. at a rate of about 1° C./minute to about 3° C./minute; and annealing the silicon oxycarbide fibers at the pyrolysis temperature for about 5 minutes to about 30 minutes.

12. The method of claim 11, wherein the siloxane and/or silazane is selected from the group consisting of 1,3,5,7-tetravinyl-1,3,5,7-tetramethylcyclotetra-siloxane, Pt-1,3,5,7-tetravinyl-1,3,5,7-tetramethylcyclotetra-siloxane complex, 1,3,5-trivinyl-1,3,5-trimethylcyclotrisiloxane, 1,3-divinyltetramethyl-disiloxane, and 1,3,5,7-tetramethyl-1,3,5,7-tetravinyl-cyclotetrasilazane.

13. The method of claim 11, wherein the step of heating the preceramic polymer fibers comprises heating the preceramic polymer fibers to a temperature of from about 100° C. to about 200° C., for about 1 hour to about 48 hours.

* * * * *